US012539755B2

United States Patent
Rossia et al.

(10) Patent No.: US 12,539,755 B2
(45) Date of Patent: Feb. 3, 2026

(54) DRIVE SYSTEM FOR AN ELECTRIC VEHICLE

(71) Applicants: FPT INDUSTRIAL S.P.A., Turin (IT); NIKOLA CORPORATION, Phoenix, AZ (US)

(72) Inventors: Giorgio Rossia, Turin (IT); Marco Tessitore, Turin (IT)

(73) Assignees: FPT INDUSTRIAL S.p.A., Turin (IT); NIKOLA CORPORATION, Phoenix, AZ (US)

( * ) Notice: Subject to any disclaimer, the term of this patent is extended or adjusted under 35 U.S.C. 154(b) by 323 days.

(21) Appl. No.: 18/037,671

(22) PCT Filed: Nov. 25, 2021

(86) PCT No.: PCT/IB2021/060982
§ 371 (c)(1),
(2) Date: May 18, 2023

(87) PCT Pub. No.: WO2022/112966
PCT Pub. Date: Jun. 2, 2022

(65) Prior Publication Data
US 2023/0406095 A1    Dec. 21, 2023

Related U.S. Application Data

(60) Provisional application No. 63/118,200, filed on Nov. 25, 2020.

(30) Foreign Application Priority Data

Nov. 25, 2020  (IT) .......................... 102020000028391

(51) Int. Cl.
*B60K 17/16* (2006.01)
*B60K 1/00* (2006.01)

(52) U.S. Cl.
CPC ...... *B60K 17/165* (2013.01); *B60K 2001/001* (2013.01)

(58) Field of Classification Search
CPC ............ B60K 17/165; B60K 2001/001; F16H 57/021; F16H 57/023; F16H 57/04
See application file for complete search history.

(56) References Cited

U.S. PATENT DOCUMENTS

2019/0293158 A1* 9/2019 Brown ................. B60K 1/00
2020/0406682 A1* 12/2020 Ogawa ................. B21D 53/90
2021/0008969 A1* 1/2021 Chopra ............... B60K 17/165

FOREIGN PATENT DOCUMENTS

EP    3663614        6/2020
EP    3663614 A1 *  6/2020 ............. H02K 7/116
(Continued)

OTHER PUBLICATIONS

International Search Report and Written Opinion in corresponding International Patent Application No. PCT/IB2021/060982, mailed Mar. 10, 2022 (14 pages).

*Primary Examiner* — Syed O Hasan
(74) *Attorney, Agent, or Firm* — Leason Ellis LLP (57) ABSTRACT

An electrically driven axle assembly is disclosed. In various embodiments, the electrically driven axle assembly includes a main housing; a differential plate configured for mounting within the main housing; a differential assembly, the differential assembly disposed adjacent the differential plate and having a bearing configured for mounting within a plate orifice that extends within the differential plate; a first drive shaft having a first inboard end connected to the differential assembly and a first outboard end configured to receive a first wheel; a first electric machine configured to drive the differential assembly; and a first gear assembly configured to operably couple the first electric machine to the differential assembly.

11 Claims, 11 Drawing Sheets

(56) References Cited

FOREIGN PATENT DOCUMENTS

| | | |
|---|---|---|
| EP | 3667876 | 6/2020 |
| WO | 2017114417 | 7/2017 |
| WO | WO-2017114417 A1 * | 7/2017 ............. B60G 5/047 |

* cited by examiner

DRIVE SYSTEM FOR AN ELECTRIC VEHICLE

CROSS-REFERENCE TO RELATED APPLICATIONS

This Patent Application is a U.S. National Phase Application under 35 U.S.C. § 371 of International Patent Application No. PCT/IB2021/060982, filed on Nov. 25, 2021, which claims priority from Italian Patent Application No. 102020000028391, filed on Nov. 25, 2020 and from U.S. Patent Application No. 63/118,200, filed on Nov. 25, 2020, all of which are incorporated by reference, as if expressly set forth in their respective entireties.

TECHNICAL FIELD

The present disclosure relates generally to drive systems for electric vehicles and, more particularly, to an electric powered drive systems for electric powered vehicles.

BACKGROUND OF THE INVENTION

Reduction of automotive fuel consumption and emissions is an ongoing process involving several areas of technology. One such area involves electrified vehicles or vehicles, including cars and trucks, powered either entirely or in hybrid fashion by electric machines or electric motors.

In general, electrified vehicles differ from conventional carbon-based fuel powered motor vehicles in that they are powered by one or more battery powered electric machines (i.e. electric motors or generators). Conventional carbon-based fuel powered motor vehicles, by contrast, typically rely on the internal combustion engine to propel the vehicle.

On the other hand, high voltage battery packs typically power the electric machines and other electrical loads of electrified vehicles. The electric machines of electrified vehicles are typically connected to a transmission or similar gearboxes, including differential mechanisms, that include relatively complex gearing arrangements. Such assemblies are usually known as e-axles.

Therefore, the need is felt to provide integrated e-axle designs whereby one or more electric motors are coupled to a drive axle of a vehicle that are simple and cost-effective.

An aim of the present invention is to satisfy the above mentioned needs in an optimized and cost-effective way.

SUMMARY OF THE INVENTION

The aforementioned aim is reached by an electrically driven axle assembly and a vehicle as claimed in the appended independent claims.

Preferred embodiments of the invention are realized according to the claims dependent on or related to the above independent claim.

In synthesis, it is provided an electrically driven axle assembly that includes a main housing; a differential plate configured for mounting within the main housing; a differential assembly, the differential assembly disposed adjacent the differential plate and having a bearing configured for mounting within a plate orifice that extends within the differential plate; a first drive shaft having a first inboard end connected to the differential assembly and a first outboard end configured to receive a first wheel; a first electric machine configured to drive the differential assembly; and a first gear assembly configured to operably couple the first electric machine to the differential assembly.

BRIEF DESCRIPTION OF DRAWINGS

For a better understanding of the present invention, a preferred embodiment is described in the following, by way of a non-limiting example, with reference to the attached drawings wherein.

DETAILED DESCRIPTION OF THE INVENTION

Figure 1:
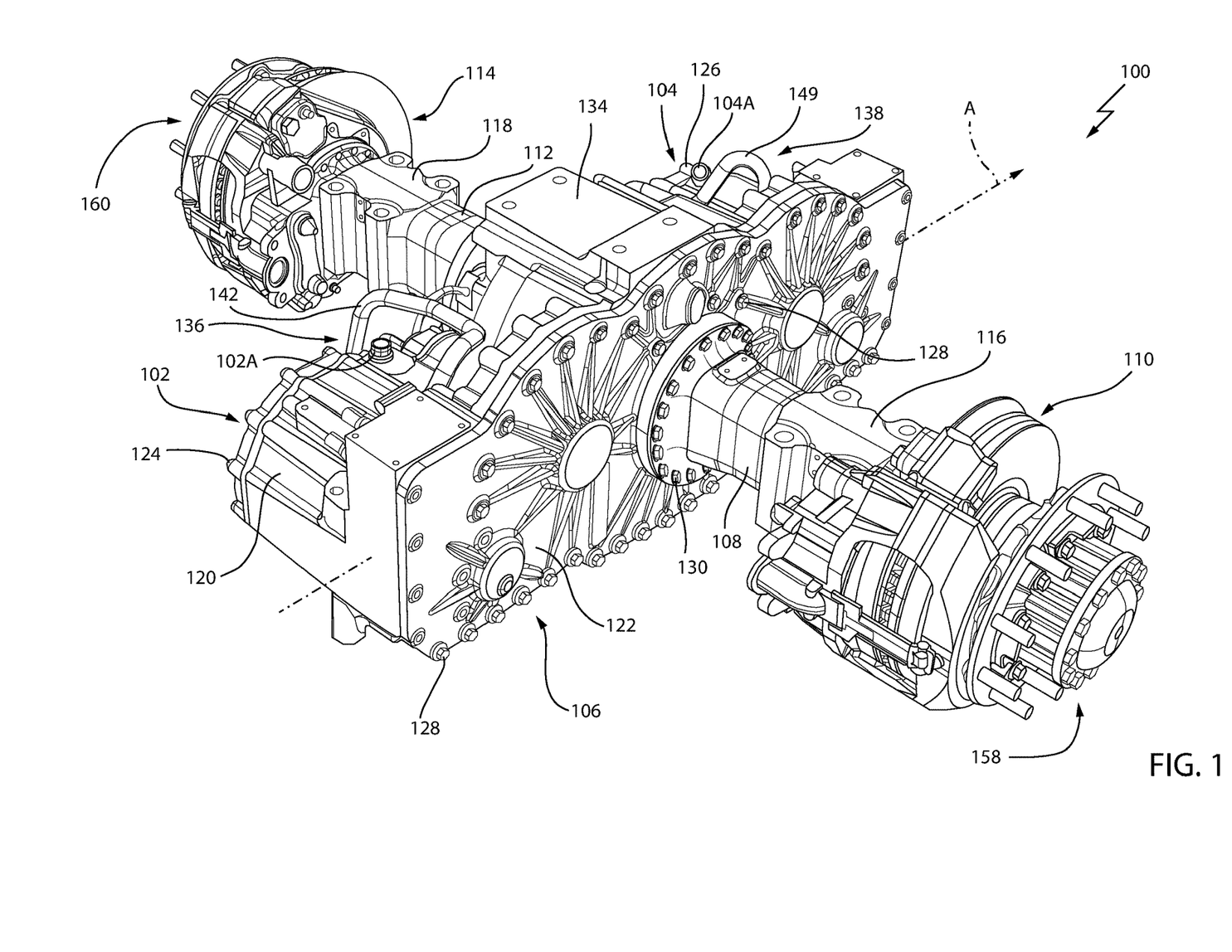
FIG. 1 is a perspective view illustrating an electrically driven assembly according to the present invention.

FIG. 1 illustrates an electrically driven assembly 100 (in the following e-axle) that can be used for providing torque to wheels of a vehicle (not shown).

The e-axle assembly 100 includes at least one electric machine, that may be, inter alia, an electrically powered motor, for example a radial flux electric motor, a transverse flux electric motor, a switched reluctance motor, a permanent magnet motor.

In particular, in the described embodiment, the e-axle assembly 100 includes a first electric machine 102 and a second electric machine 104 mounted onto or integrated into a main housing 106 of the e-axle assembly 100.

Preferably, the first electric machine 102 is disposed aft of the second electric machine 104 with respect to a longitudinal axis A of the vehicle, i. e. concordant to vehicle driving direction, into which the e-axle assembly 100 is integrated.

Preferably, the e-axle assembly 100 comprise axle housings for each of the axles. In detail, it comprises a first axle housing 108 (or a right-side axle housing) mounted at a first end to the main housing 106 and a second axle housing 112 (or a left-side axle housing) is mounted at a first end to the main housing 106.

The e-axle assembly 100 further comprises a wheel assembly for each of the axles. In detail, it comprises a first wheel assembly 110 (or a right-side brake assembly) mounted to a second end of the first axle housing 108 and a second wheel assembly 114 (or a left-side brake assembly) mounted to a second end of the second axle housing 112.

The axle housings 108, 112 each includes respective mounting pads 116, 118 configured for securing a respective suspension assembly, i.e. a right-side suspension assembly for first axle housing 108 and a left-side suspension assembly 112 for the right Referring more specifically to the main housing 106, the main housing 106 includes a housing case 120 and a cover plate 122 realized as a separate element and configured to be fixed to this latter. As per se clear by its name, the cover plate 122 is a substantially flat element having a main extension over the longitudinal axis A and a shape configured to match with the outer perimeter of the housing case 120.

As illustrated, the housing case 120 delimit an inner space configured to the first electric machine 102 and the second electric machine 104, both of which are secured to the housing case 120 via a first plurality of mounting fasteners 124 and a second plurality of mounting fasteners 126, respectively.

The cover plate 122 is similarly secured to the housing case 120 via a third plurality of mounting fasteners 128. Preferably, the first axle housing 108 is secured to the cover plate 122 via a fourth plurality of mounting fasteners 130 and the second axle housing 112 is secured to the housing case 120 via a fifth plurality of mounting fasteners 132.

Preferably the housing case 120 may also include a housing mounting pad 134 configured for being secured to other operative elements of the vehicle.

Advantageously, the e-axle assembly 100 further includes a lubricant routing system that comprises a first coolant circuit 136 (or an aft lubricant circuit) and a second coolant circuit 138 (or a forward lubricant circuit).

Preferably, the first coolant circuit 136 includes a first coolant conduit 142 configured to transport a coolant fluid (inter alia: water, water and ethylene glycol mixed at a ratio of about 40% to about 60%, or any other suitable coolant fluid) through electric machine 102 to cool the first electric machine 102. The coolant may be introduced to electric machine 102 in any suitable manner, for example via a supply hose or tubing (not pictured) routed from a primary coolant reservoir of a vehicle and connected to inlet 102A.

Similarly, the second coolant circuit 138 includes a second coolant conduit 148 configured to transport a coolant fluid through electric machine 104 to cool electric machine 104. The coolant may be introduced to electric machine 104 in any suitable manner, for example via a supply hose or tubing (not pictured) routed from a primary coolant reservoir of a vehicle and connected to inlet 104A.

After passing through and/or around electric machine 102 and/or 104, the coolant may pass through one or more heat exchanger(s) to receive additional heat from a lubricant fluid for e-axle assembly 100 (as discussed in more detail herein below) prior to being returned to a common cooling system of a vehicle associated with e-axle assembly 100.

Figure 10:
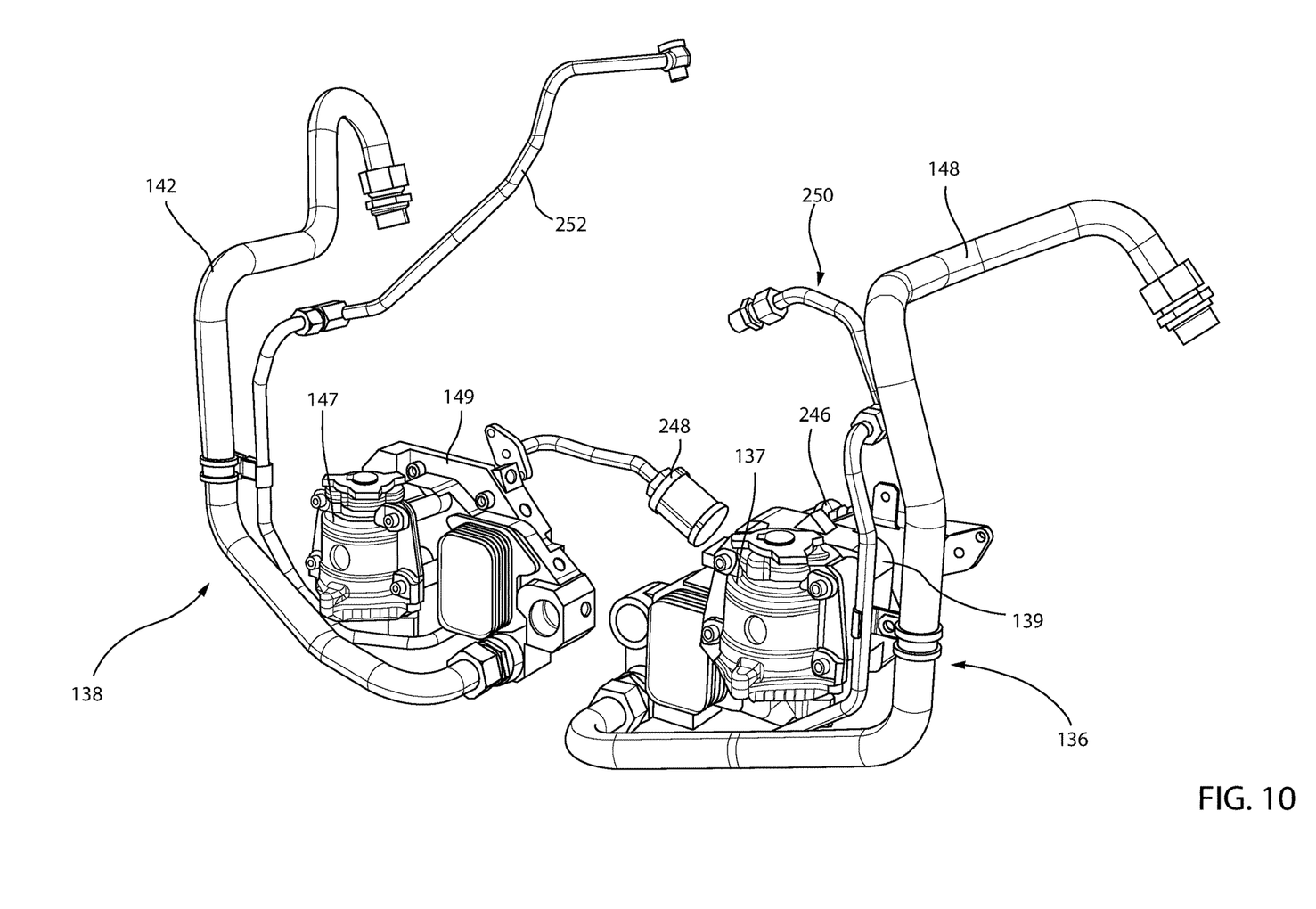
FIG. 10 is a perspective view showing an operational system of the electrically driven assembly according to the invention.

Referring to FIG. 10, first coolant circuit 136 may include an aft lubricant pump 137 which pumps a lubricant through first lubricant circuit 250 and thence to desired regions of e-axle assembly 100.

The first coolant circuit 136 may further comprise a first lubricant filter 246 configured to filter lubricant collected from a sump within the housing case 120 and thereafter route the lubricant to a heat exchanger 139 and from thence back to the aft lubricant pump 137. In the heat exchanger 139, an amount of thermal energy is transferred from the lubricant to the coolant in a suitable manner, for example via a brazed plate heat exchange configuration, in order to regulate the temperature of the lubricant.

Figure 11:
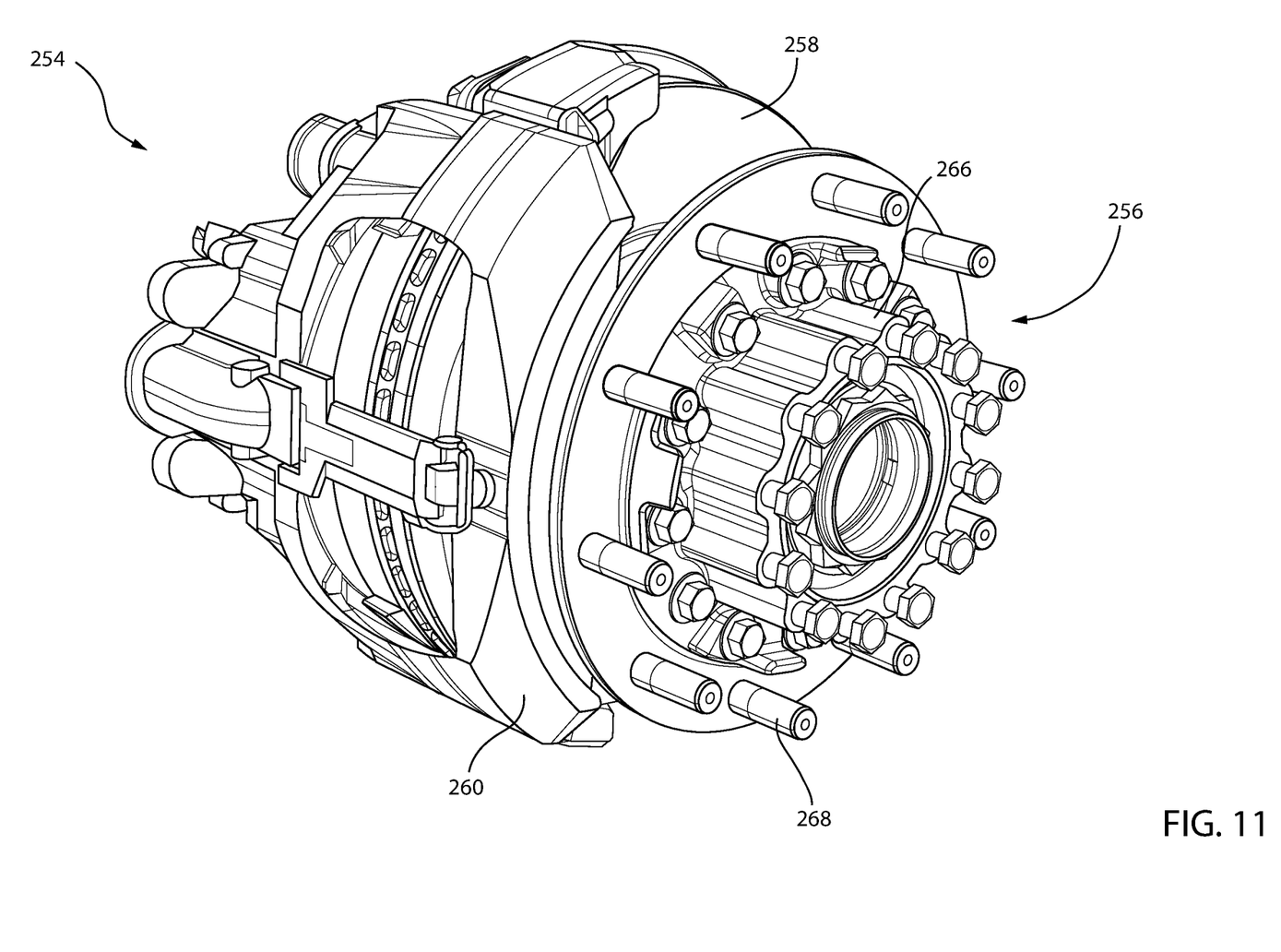
FIG. 11 is a perspective view showing a further operational system of the electrically driven assembly according to the invention.

Similarly to the above, the second coolant circuit 138 comprises a forward lubricant pump 147 which pumps a lubricant through second lubricant circuit 252 and thence to desired regions of e-axle assembly 100. The second coolant circuit 138 comprises a second lubricant filter 248 is configured to filter lubricant collected from a sump within the housing case 120 and thereafter route the lubricant to a heat exchanger 149 and from thence back to the forward lubricant pump 147. The lubricant may comprise any suitable lubricant, for example a natural, synthetic blend, or full synthetic differential oil. Preferably such oil has a viscosity rating of SAE 75W-90, 80W-90, 85W-90, 75W-140, 85W-140, and/or the like. The coolant may exit heat exchangers 139/149 via respective return outlets and thereafter be routed to other components of a cooling system of a vehicle, for example a radiator, in order to remove thermal energy from the coolant in preparation for further use.

Figure 2:
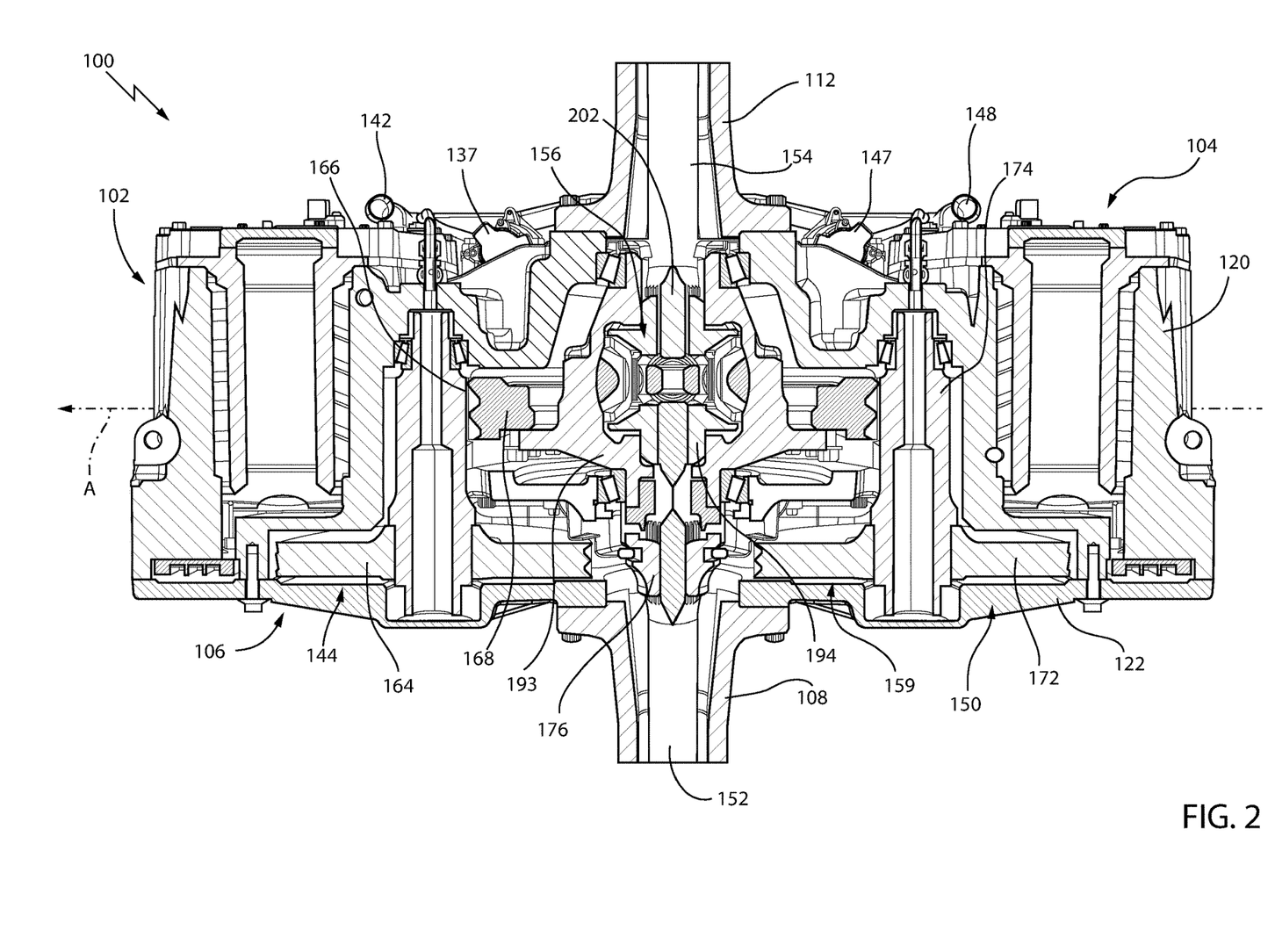
FIG. 2 is an overhead sectional view of the electrically driven assembly of FIG. 1.
Figure 3:
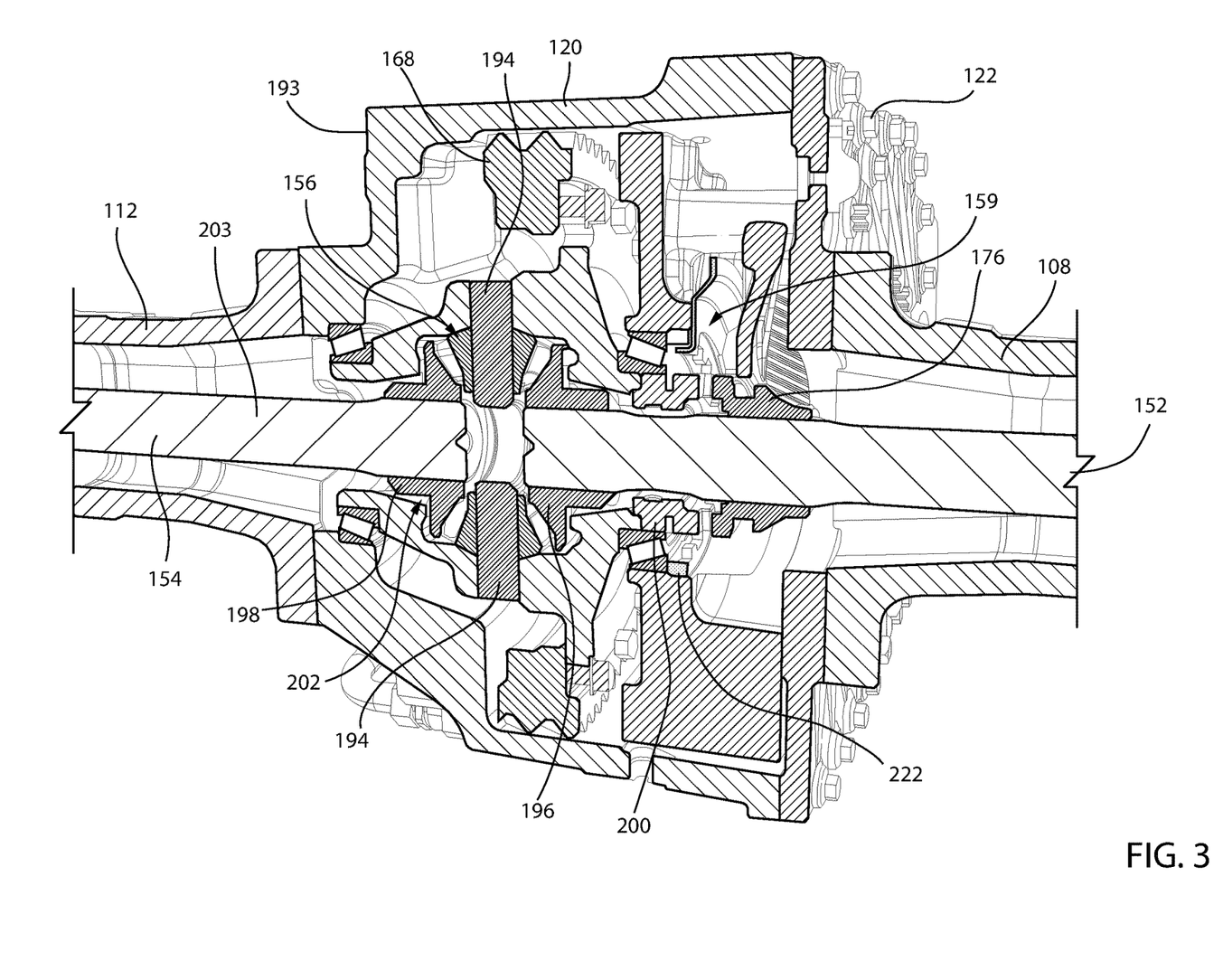
FIG. 3 is a perspective sectional view of the electrically driven assembly of FIG. 1.

Referring to sectional views of FIGS. 2 and 3, the e-axle assembly 100 further includes a first drive shaft 152 (or a right-side drive shaft), a second drive shaft 154 (or a left-side drive shaft) and a differential assembly 156. As shown, the first drive shaft 152 is connected at an inboard end (or a first inboard end) to the differential assembly 156 and at an outboard end (or a first outboard end) to a first drive assembly 158 (or a right-side drive assembly) making part of the wheel assembly 110 and configured for mounting a wheel of the vehicle, as stated above.

Similarly, the second drive shaft 154 is connected at an inboard end (or a second inboard end) to the differential assembly 156 and at an outboard end (or a second outboard end) to a second drive assembly 160 (or a left-side drive assembly) making part of the wheel assembly 114 and configured for mounting a wheel of the vehicle, as stated above.

Figure 4:
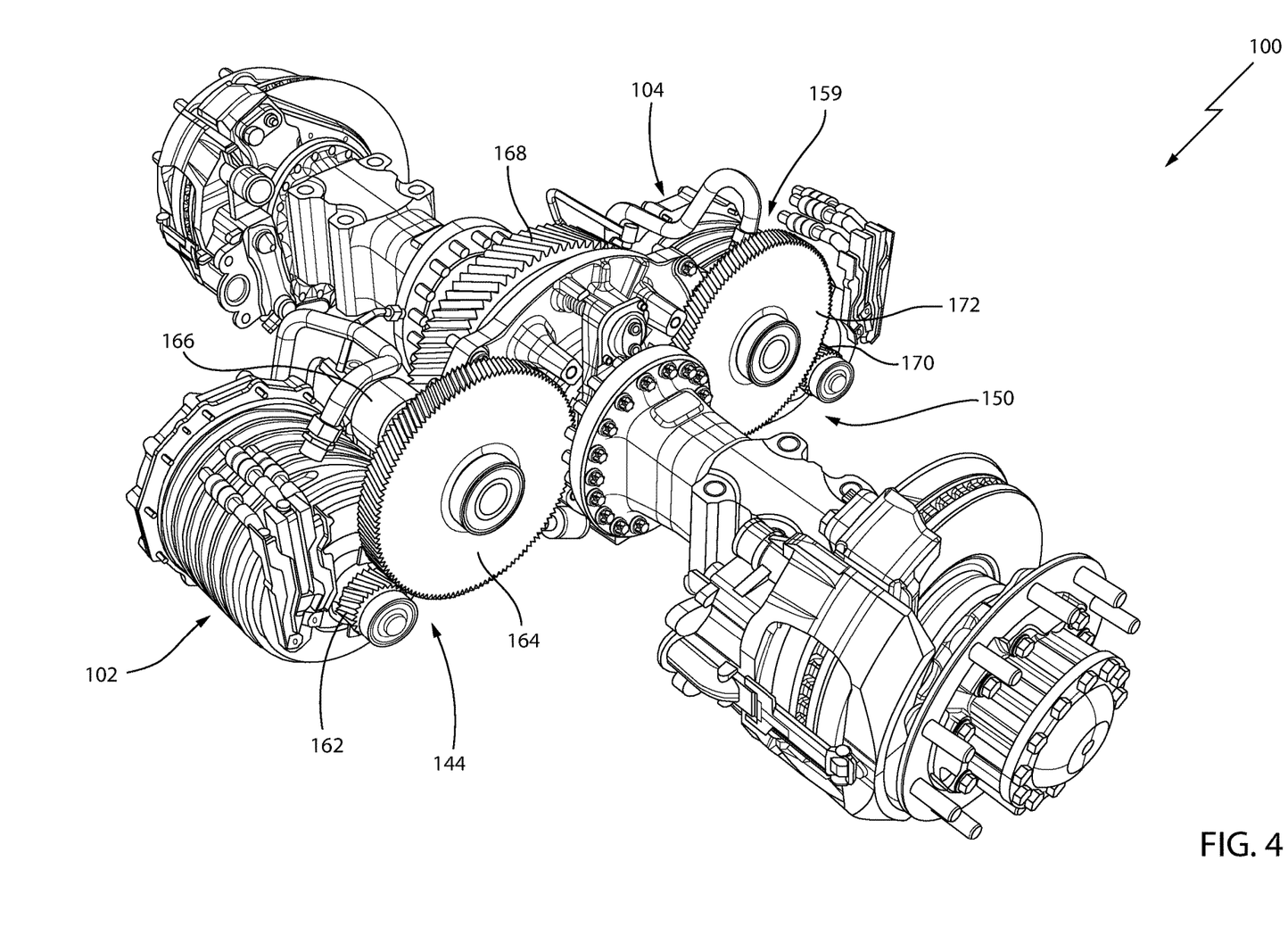
FIG. 4 is a perspective view illustrating the electrically driven assembly according to the invention with parts removed.
Figure 5:
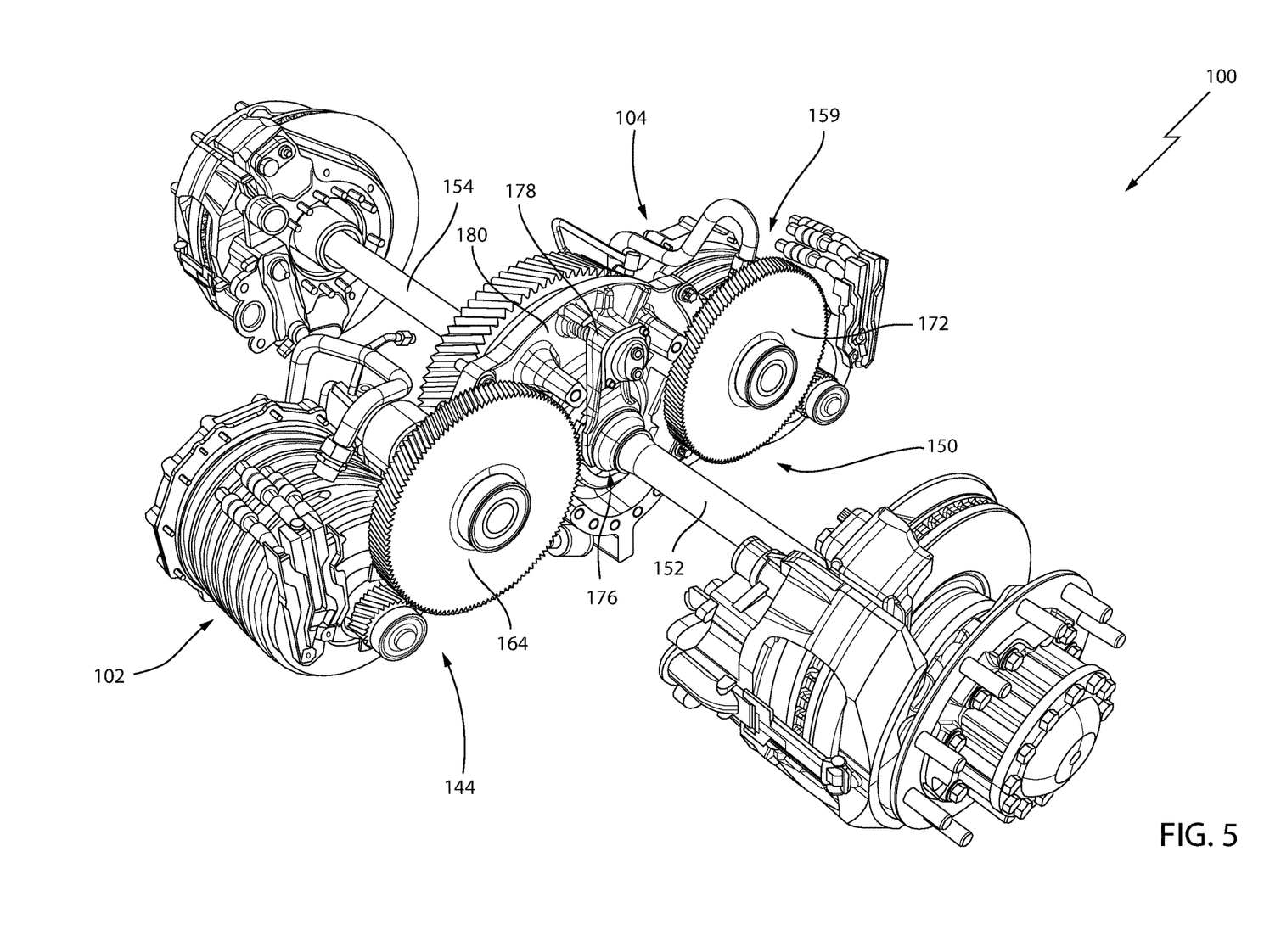
FIG. 5 is a perspective view illustrating the electrically driven assembly of FIG. 4 with further parts removed.
Figure 6:
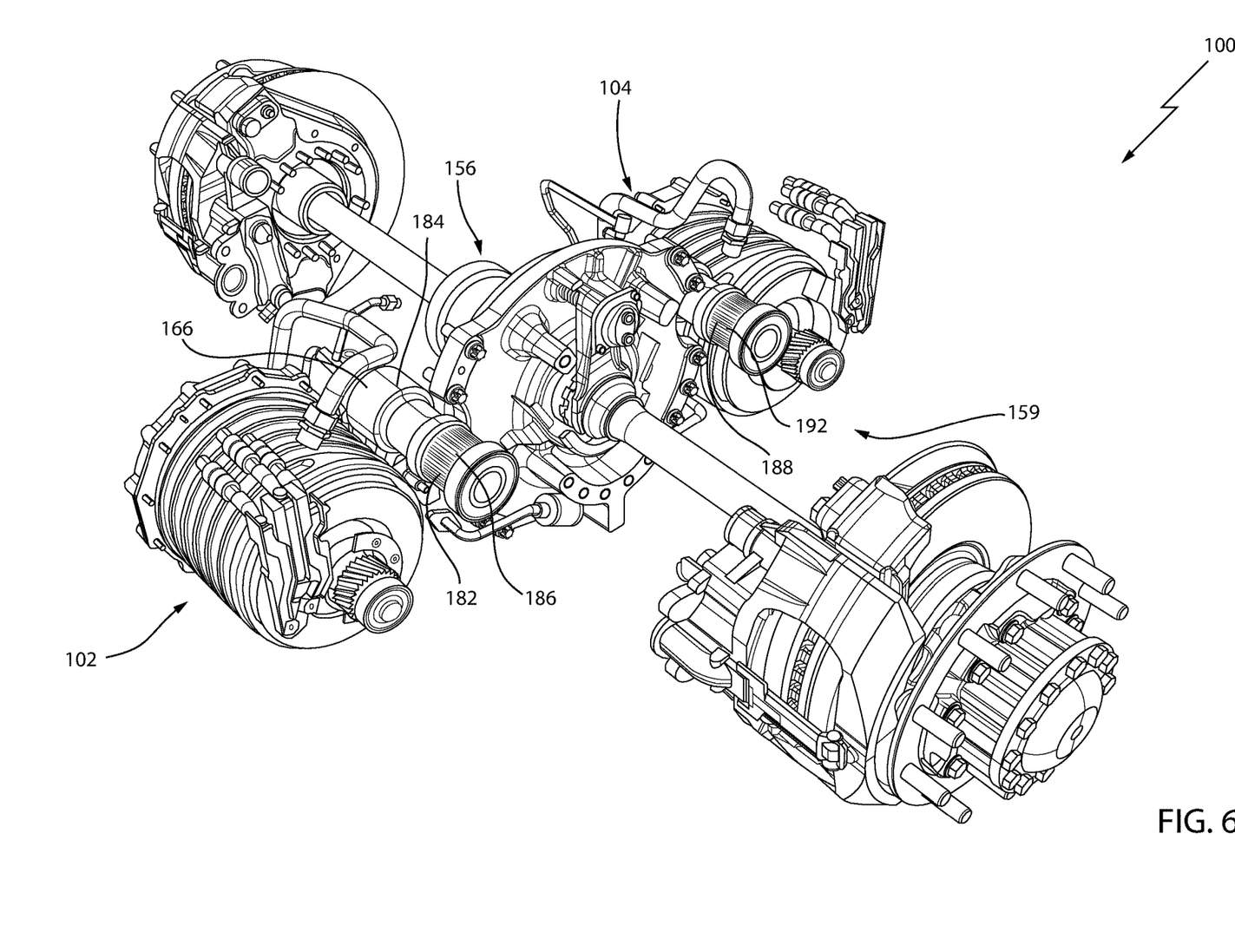
FIG. 6 is a perspective view illustrating the electrically driven assembly of FIG. 5 with further parts removed.

Referring to FIGS. 4 to 6 the first and second electric machines 102, 104 are each connected to the differential assembly 156 thanks to a mechanical transmission 159 as detailed below.

In particular, see FIG. 4, the mechanical transmission 159 comprises first gear assembly 144 operatively interposed between the first electric machine 102 and the differential assembly 156 and a second gear assembly 150 operatively interposed between the first electric machine 102 and the differential assembly 156.

Preferably, the first gear assembly 144 includes a first pinion gear 162 that is driven by the first electric machine 102 and a first driven gear 164 configured to be driven by first pinion gear 162 via meshing engagement between the first pinion gear 162 and the first driven gear 164. The first driven gear 164 is connected via a first shaft 165 (or a first gear shaft) to a first drive gear 166 (gear tooth geometry not illustrated for sake of simplicity) that is configured to drive a main differential driven gear 168 that is configured to provide a drive input to the differential assembly 156.

Similarly, the second gear assembly 150 includes a second pinion gear 170 that is driven by the second electric machine 104 and a second driven gear 172 configured to be driven by second pinion gear 170 via meshing engagement between the second pinion gear 170 and the second driven gear 172. The second driven gear 172 is connected via a second shaft 173 (or a second gear shaft) to a second drive gear 174 (gear tooth geometry not illustrated for sake of simplicity) that is configured to drive the main differential driven gear 168.

It is noticed that the main differential driven gear 168 is driven together and in conjunction between the first drive gear 166 and the second drive gear 174, thereby providing respectively a first and second drive inputs to the differential assembly 156.

With reference to FIG. 6, it is noticed that preferably the first driven gear 164 is configured to slide onto the first shaft 165. A first spline fitting 186 is cut into the first shaft 165 at a first end of the first shaft 165 and configured to engage a complementary spline fitting cut into the first driven gear 164. As described above, a second end of the first shaft 165 includes the first drive gear 166 (gear tooth geometry not illustrated) that is configured to drive the main differential driven gear 168 that provides a drive input to the differential assembly 156.

Similarly, the second driven gear 172 is configured to slide onto the second shaft 173. A second spline fitting 192 is cut into the second shaft 173 at a first end of the second shaft 173 and configured to engage a complementary spline fitting cut into the second driven gear 172. As described above, a second end of the second shaft 173 includes the second drive gear 174 (gear tooth geometry not illustrated) that is configured to drive the main differential driven gear 168, together and in conjunction with the first drive gear 166, thereby providing a second drive input to the differential assembly 156.

With reference to FIG. 5, the first drive shaft 152 is connected to a clutch mechanism 176, e.g., a dog clutch, as shown, that enables the differential assembly 156 to be locked, such that equal power and torque are provided to both the first drive shaft 152 and the second drive shaft 154.

In particular, the second drive shaft 154 is connected to the differential assembly 156 in a manner such that the second drive shaft 154 is continuously powered by the differential assembly 156. A shift mechanism 178 is connected to a differential plate 180 and operably coupled to the clutch mechanism 176 to selectively lock the differential assembly 156.

In other words, when the clutch mechanism 176 is in a first operative position it is disengaged and the differential assembly 156 operates in typical fashion, enabling one of the two drive shafts to rotate at a different speed from the other drive shaft (e.g., while maneuvering the vehicle about a sharp corner). Conversely, when the clutch mechanism 176 is in a second operative position, it is engaged and the differential assembly 156 is locked, preventing the two drive shafts from rotating at different speeds.

In greater detail, the clutch mechanism 176 comprises actuator means 179 for controlling the movement of the shift mechanism 178 along the first drive shaft 152 between the first and second operative positions. Clearly such actuator means 179 may be realized in many different ways.

Figure 7:
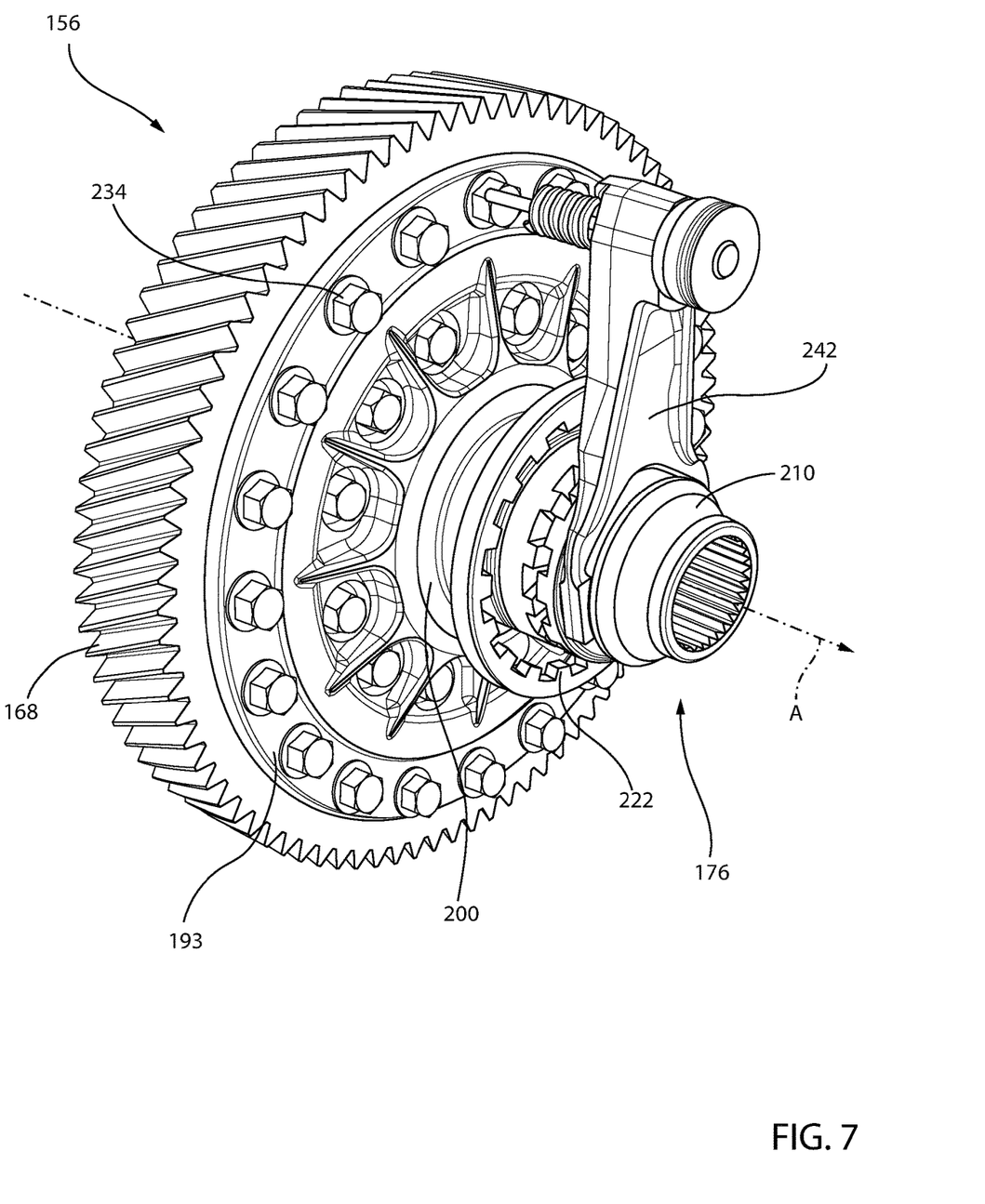
FIG. 7 is a perspective view illustrating some operative elements of the electrically driven assembly according to the invention.

As shown in FIG. 7, such actuator means 179 comprises a pneumatic bellow 179' connected via an arm 242 to the clutch mechanisms 176 and configured to be controlled to move the clutch mechanism 176 via arm 242 between the aforementioned operational positions. The shift mechanism 178 advantageously comprises elastic means 179" configured to oppose a force to the pneumatic bellow 179 that is configured to maintain the shift mechanism 178 in its first operative position.

As described above and with reference to FIG. 7, the differential assembly 156 includes the main differential driven gear 168 and the clutch mechanism 176.

The main differential driven gear 168 is mounted on a carrier 193, which supports a plurality of planetary bevel gears 194 (see sectional views 2 and 3) that rotate with respect to the carrier 193 and revolve about a longitudinal axis A that extends through the first drive shaft 152 and the second drive shaft 154). The plurality of planetary bevel gears 194 engage a first driven bevel gear 196 (or a right-side driven bevel gear) and a second driven bevel gear 198 (or a left-side driven bevel gear).

The first driven bevel gear 196 is rotatably connected to a first differential output 200 (or a right-side differential output) and the second driven bevel gear 198 is rotatably connected to a second differential output 202 (or a left-side differential output).

In detail, the first differential output 200 includes a first plurality of teeth 204 configured to engage a second plurality of teeth 206 connected to a first shaft coupling 210. The first plurality of teeth 204 and the second plurality of teeth 206 provide the clutch mechanism 176, as described above and preferably defining a clutch mechanism. Engagement of the dog clutch 208 provides a lock mechanism between the first differential output 200 and the first shaft coupling 210 configured to receive an inboard end of the first drive shaft 152.

Conversely, the second differential output 202 may be represented by a direct splined coupling 203 between the second driven bevel gear 198 and the second drive shaft 154.

Figure 8:
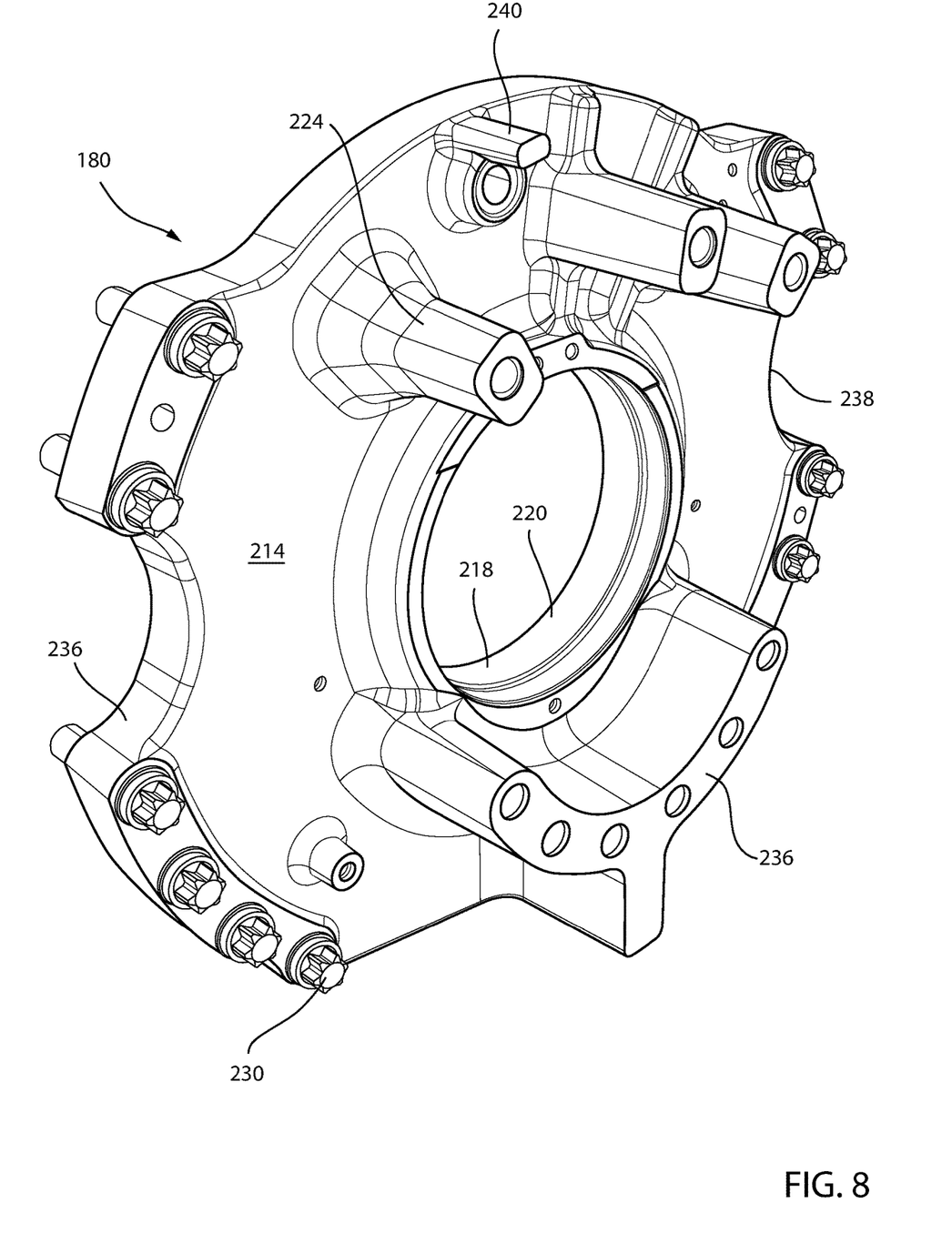
FIG. 8 is a front perspective view illustrating a further operative element of the electrically driven assembly according to the invention.
Figure 9:
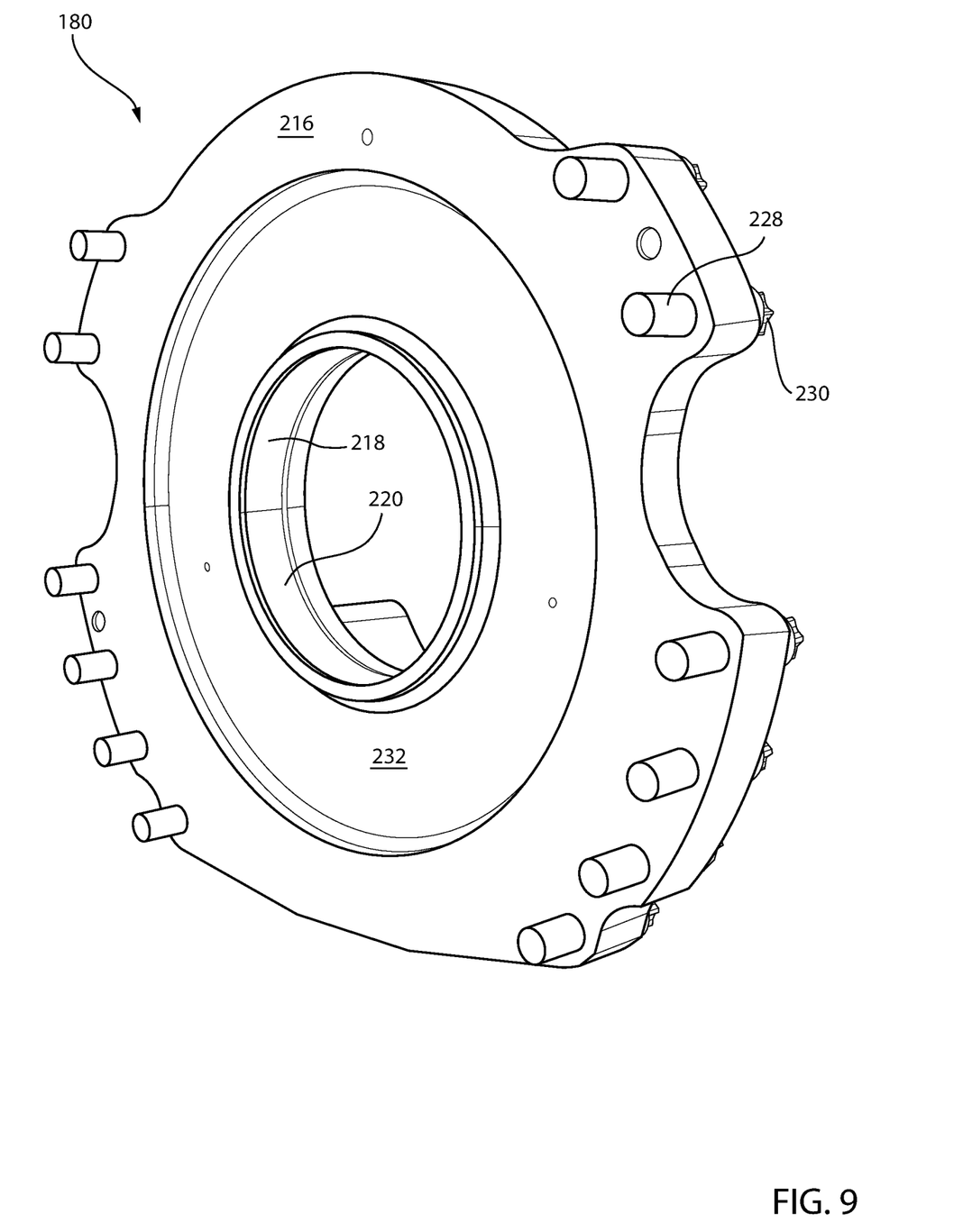
FIG. 9 is a rear perspective view illustrating the further operative element of FIG. 8.

Referring now to FIGS. 8 and 9, the differential plate 180 includes a first plate side 214 (or a right-facing plate side) and a second plate side 216 (or a left-facing plate side).

The differential plate 180 defines a plate orifice 218 that extends through the differential plate 180, from the first plate side 214 to the second plate side 216. In particular, the plate orifice 218 provides a surface 220 against which an outer race of a bearing 222 may be press fit or otherwise secured to the differential plate 180.

In particular, the first plate side 214 includes a first boss 224 (or a first plurality of bosses) to which the cover plate 122 may abut and be secured via one or more of the third plurality of mounting fasteners 128 described above with reference to FIG. 1.

The first plate side 214 may also include a second boss 226 (or a second plurality of bosses) to which the cover plate 122 may abut and be secured via one or more of the fourth plurality of mounting fasteners 130, which are also configured to secure the first axle housing 108 to the cover plate 122 or to the main housing 106, as also described above with reference to FIG. 1

Preferably, the cover plate 122 may also include a plurality of apertures 228 through which a sixth plurality of fasteners 230 may extend and be secured to mating structure within the housing case 120, as shown in FIG. 1.

Further preferably, the second plate side 216 of the cover plate 122 includes a recess portion 232 that is configured to provide space for various portions of the differential assembly 156 to reside. For example, the recess portion 232 may be configured to provide space for one or more fasteners 234 that secure the carrier 193 to the main differential driven gear 168, as shown in FIG. 7.

Moreover, the cover plate 122 may also include a first cutout portion 236 (or an aft cutout portion) configured to provide space for positioning the first shaft 165 and a second cutout portion 238 (or a forward cutout portion) configured to provide space for positioning the second shaft 173 (see, e.g., FIG. 4A). The first and second cutout portions 236, 238 are realized radially with respect to the axis of opening 218.

Preferably, the first plate side 214 of the cover plate 122 may also include a third boss 240, against which an end or a portion of arm 242 of the clutch mechanism 176 may abut.

Each between the first and second wheel assemblies 110, 114 comprises furthermore a respective brake assembly 254, 256.

In particular, the brake assembly 254 includes a rotor 258 configured to engage either of the first drive shaft 152 or the second drive shaft 154 and a caliper assembly 260 configured to frictionally engage the rotor 258 to slow or stop a vehicle being powered by the e-axle assembly 100.

Preferably, the brake assembly 254 also includes a back plate 262 (or housing) having a plurality of brake assembly studs 264 configured to secure the brake assembly 254 to either of the first axle housing 108 or the second axle housing 112.

Moreover, the drive assembly 256 may include a hub 266 that is also configured for engagement with either of the first drive shaft 152 or the second drive shaft 154. Furthermore, a plurality of drive assembly studs 268 extend from the drive assembly 256 and are configured to secure a wheel of the vehicle to the drive assembly 256.

In view of the foregoing, the advantages of the described electrical driven assembly 100 according to the invention are apparent.

Benefits of the disclosed structural details include the ability to change wheelbase width by changing the lengths of one or both of the first drive shaft 152 and the second drive shaft 154, together with the first axle housing 108 and the second axle housing 112.

In addition, the differential plate 180 provides structural robustness to the e-axle assembly 100 that enables the main housing 106, including the housing case 120 and the cover plate 122, be made to have less weight than might otherwise be possible, generally through fabricating the components to have lesser thicknesses and/or lesser stiffening elements, leaner fixation bolts between housing and cover.

The differential plate 180 also enables tailoring of the load paths away from the components of the main housing 106.

It is clear that modifications can be made to the described electrically driven assembly 100 which do not extend beyond the scope of protection defined by the claims.

For example, while it is described that the first gear assembly 144 and the second gear assembly 150 configured to operate at a speed reduction from the first pinion gear 162 and the second pinion gear 170 to the main differential driven gear 168, other speed reduction ratios are contemplated and may be achieved by increasing or decreasing the diameters of the various gears comprised within the first gear assembly 144 and the second gear assembly 150.

Further, while it is described that the assembly 100 comprises two electric machines it is clear that the assembly 100 of the present invention may be directed to a single electric machine, or even three or four or more electric machines, with each electric machine being configured to provide a torque or rotational input to the main differential driven gear 168.

The invention claimed is:

1. An electrically driven axle assembly, e-axle, for a vehicle, comprising:
   a main housing defining an inner space;
   a differential plate configured for mounting within said inner space fixedly to said main housing, said differential plate defining a through opening;
   a differential assembly, said differential assembly being disposed adjacent to said differential plate and being rotatably supported over said differential plate;
   a first drive shaft having a first inboard end connected to said differential assembly and a first outboard end configured to receive a first wheel of said vehicle;
   a second drive shaft having a second inboard end connected to said differential assembly and a second outboard end configured to receive a second wheel of said vehicle;
   at least one electric machine configured to drive said differential assembly; and
   a mechanical transmission housed within said inner space and operatively connected between said at least one electric machine and said differential assembly;
   wherein the main housing includes a housing case and a cover plate realized as a separate element and fixedly mounted to said housing case;
   wherein said differential plate defines a first side and a second side opposite to the first side, said differential plate defining a plurality of abutments configured to cooperate by contact with said cover plate and to allow the mounting of said differential plate to said cover plate.

2. E-axle according to claim 1, wherein said at least one electric machine, said differential assembly and said differential plate are disposed within and mounted to said housing case.

3. E-axle according to claim 1, wherein said cover plate is mounted to said housing case via threaded elements.

4. E-axle according to claim 1, comprising an axle housing for each between said first and second drive shafts, each axle housing comprising a first end configured to be mounted to said main housing and a second end configured to be mounted to a respective wheel assembly.

5. E-axle according to claim 4, wherein the main housing includes a housing case and a cover plate realized as a separate element and fixedly mounted to said housing case; and
   wherein said first axle housing is connected to said cover plate and said second axle housing is connected to said housing case.

6. E-axle according to claim 1, wherein said differential plate defines a first side and a second side opposite to the first side, said differential plate defining a plurality of openings configured to allow the passage of fixation means for fixing said differential plate to said housing case.

7. E-axle according to claim 1, wherein said differential plate defines a first and a second cutout portions radially defined with respect to said opening.

8. E-axle according to claim 1, wherein said differential plate defines a recess portion configured to house a portion of said differential assembly.

9. E-axle according to claim 1, wherein said mechanical transmission comprises for each of said at least one electric machine a first and a second intermediate gears carried by an intermediate shaft housed in a rotatably free manner within said main housing, said first intermediate gear being configured to cooperate with an output gear of said at least one electric machine and said second intermediate gear being configured to cooperate with a gear fixedly carried with said differential assembly.

10. E-axle according to claim 1, comprising a clutch mechanism configured to couple one between said first and second drive shafts thereby locking said differential assembly.

11. Vehicle comprising a e-axle according to claim 1.

* * * * *